US006713526B2

(12) United States Patent
Dillon et al.

(10) Patent No.: US 6,713,526 B2
(45) Date of Patent: Mar. 30, 2004

(54) CURABLE SLURRY FOR FORMING CERAMIC MICROSTRUCTURES ON A SUBSTRATE USING A MOLD

(75) Inventors: Kenneth R. Dillon, White Bear Lake, MN (US); Kyung H. Moh, Woodbury, MN (US); Thomas Edward Wood, Stillwater, MN (US); Raymond C. Chiu, Woodbury, MN (US); Vincent Wen-Shiuan King, Woodbury, MN (US); Richard P. Rusin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/057,599

(22) Filed: Jan. 24, 2002

(65) Prior Publication Data

US 2002/0102411 A1 Aug. 1, 2002

Related U.S. Application Data

(63) Continuation of application No. 09/221,007, filed on Dec. 23, 1998, now Pat. No. 6,352,763.

(51) Int. Cl.$^7$ .................................................. C08F 2/46
(52) U.S. Cl. ........................ 522/182; 522/31; 522/48; 522/68; 522/83; 524/442; 524/492; 524/386; 524/388; 524/497; 106/287.16; 106/287.29; 106/287.1; 106/280; 106/281.1
(58) Field of Search .................. 524/442, 492, 524/386, 388, 497; 522/83, 182, 31, 48, 68; 106/287.1, 287.16, 280, 281.1, 287.29

(56) References Cited

U.S. PATENT DOCUMENTS

| 4,026,714 A | 5/1977 | Lewis |
| 4,536,435 A | 8/1985 | Utsumi et al. |
| 4,554,259 A | 11/1985 | Franklin et al. |
| 4,617,279 A | 10/1986 | Manabe et al. |
| 4,640,900 A | 2/1987 | Kokubu et al. |
| 4,867,935 A | 9/1989 | Morrison, Jr. |
| 4,975,104 A | 12/1990 | Kim |
| 5,011,391 A | 4/1991 | Kawasaki et al. |
| 5,116,704 A | 5/1992 | Kwon |
| 5,136,207 A | 8/1992 | Miyake et al. |
| 5,209,688 A | 5/1993 | Nishigaki et al. |
| 5,268,233 A | 12/1993 | Heller et al. |
| 5,342,563 A | 8/1994 | Quinn et al. |
| 5,527,624 A | 6/1996 | Higgins et al. |
| 5,581,876 A | 12/1996 | Prabhu et al. |
| 5,585,428 A | 12/1996 | Quinn et al. |
| 5,601,468 A | 2/1997 | Fujii et al. |
| 5,658,832 A | 8/1997 | Bernhardt et al. |
| 5,667,418 A | 9/1997 | Fahlen et al. |
| 5,672,460 A | 9/1997 | Katoh et al. |
| 5,703,433 A | 12/1997 | Fujii et al. |
| 5,714,840 A | 2/1998 | Tanabe et al. |
| 5,747,931 A | 5/1998 | Riddle et al. |
| 5,840,465 A | 11/1998 | Kakinuma et al. |
| 5,853,446 A | 12/1998 | Carre et al. |
| 5,854,152 A | 12/1998 | Kohli et al. |
| 5,854,153 A | 12/1998 | Kohli |
| 6,001,533 A | * 12/1999 | Sega et al. |
| 6,023,130 A | 2/2000 | Sakasegawa et al. |
| 6,048,910 A | * 4/2000 | Furuya et al. |
| 6,159,772 A | 12/2000 | Vinciarelli et al. |

FOREIGN PATENT DOCUMENTS

| EP | 0 802 170 A2 | 10/1997 |
| EP | 0 836 892 A2 | 4/1998 |
| EP | 0 855 731 A1 | 7/1998 |
| JP | 6-293191 | 10/1994 |
| JP | 8-119725 | 5/1996 |
| JP | 8-273537 | 10/1996 |
| JP | 8-301631 | 11/1996 |
| JP | 8-321258 | 12/1996 |
| JP | 9-12336 | 1/1997 |
| JP | 9-134676 | 5/1997 |
| JP | 9-147754 | 6/1997 |
| JP | 9-245629 | 9/1997 |
| JP | 9-259754 | 10/1997 |
| JP | 9-265905 | 10/1997 |
| WO | 92961 | 6/1997 |

OTHER PUBLICATIONS

"Hawley's Condensed Chemical Dictionary", 1987, Van Nostrand Reinhold Company Inc., 11$^{th}$ Edition, p. 323, no month.*

Ciba Specialty Chemicals, "Irgacure ® 819" p 1–3, last edit: Mar. 4, 1997 by Business Product Management BU–ICA, Basle, no month.

* cited by examiner

Primary Examiner—Deborah Jones
Assistant Examiner—Wendy Boss
(74) Attorney, Agent, or Firm—Robert J. Pechman

(57) ABSTRACT

A curable slurry for forming ceramic microstructures on a substrate using a mold. The slurry is a mixture of a ceramic powder, a fugitive binder, and a diluent. The ceramic powder has a low softening temperature in a range of about 400° C. to 600° C. and a coefficient of thermal expansion closely matched to that of the substrate. The fugitive binder is capable of radiation curing, electron beam curing, or thermal curing. The diluent promotes release properties with the mold after curing the binder or quick and complete burn out of the binder during debinding.

7 Claims, No Drawings

US 6,713,526 B2

CURABLE SLURRY FOR FORMING CERAMIC MICROSTRUCTURES ON A SUBSTRATE USING A MOLD

CROSS REFERENCE TO RELATED APPLICATIONS

This application is a continuation of U.S. application Ser. No. 09/221,007, filed Dec. 23, 1998, now U.S. Pat. No. 6,352,763.

TECHNICAL FIELD

The present invention generally relates to compositions useful for molding ceramic microstructures on a substrate.

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (uv) radiation within the cell. In the case of PDPs, the interior of the cell is coated with a phosphor which gives off red, green, or blue visible light when excited by uv radiation. The size of the cells determines the size of the picture elements (pixels) in the display. PDPs and PALC displays can be used, for example, as the displays for high definition televisions (HDTV) or other digital electronic display devices.

One way in which ceramic barrier ribs can be formed on glass substrates is by direct molding. This has involved laminating a planar rigid mold onto a substrate with a glass- or ceramic-forming composition disposed therebetween. The glass- or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate. However, in applications such as PDP substrates, highly precise and uniform barrier ribs with few or no defects or fractures are required. These requirements can pose challenges, especially during removal of the mold from the green state ribs and during firing of the green state ribs.

Mold removal can damage ribs due to difficulty in mold release. Because barrier ribs tend to shrink during firing, the green state ribs must be taller than the size desired for the fused ribs. Taller structures make demolding even more difficult. Mold removal can also damage the mold. When material cannot be completely removed from the mold, the mold must be discarded. In addition, at temperatures required for firing, the barrier ribs can fracture, delaminate from the substrate, or warp. The substrate also goes through dimensional changes during firing due to thermal expansion and release of internal stresses.

SUMMARY OF THE INVENTION

The present invention provides a curable slurry for forming ceramic microstructures on a substrate. Such microstructures can be used, for example, as spacer ribs in electronic displays such as ceramic barrier ribs in PDPs. Preferred embodiments of the slurry of the present invention can provide several useful properties such as the ability to adhere to the substrate in the cured green state as well as during and after firing, the ability to demold from the microstructure-forming mold after curing, the ability to debind quicker and more completely at relatively low temperatures, the ability to retain good dielectric properties, the capability for environmentally-friendly disposal, or the ability to maintain precise dimensions throughout processing. In addition, further preferred embodiments of the slurry of the present invention can enhance adhesion to the substrate.

In a first aspect, the present invention provides a slurry for patterning microstructures on a substrate using a mold. The slurry is a mixture of (a) a ceramic powder having a softening temperature in a range of about 400° C. to 600° C. and a coefficient of thermal expansion in a range of about 10% less than to about 10% more than the coefficient of thermal expansion of the substrate; (b) a fugitive binder capable of being hardened by radiation curing, electron beam powder is present in an amount of about 40 to 96% by weight, the fugitive binder is present in an amount of about 2 to 50% by weight, and the diluent is present in an amount of about 2 to 50% by weight.

In another aspect, the present invention provides an assembly for patterning ceramic microstructures onto a substrate. The assembly includes a mold, the mold having a patterned surface characterized by a plurality of protrusions and indentions thereon, and the above-described slurry capable of filling the indentions of the patterned surface of the film.

In yet another aspect, the present invention provides a substrate assembly for plasma displays panels which includes a glass substrate with green state microstructures thereon. The green state microstructures are formed by molding and curing the above-described slurry. After curing, the diluent remains in the green state microstructures as a liquid in an interpenetrating network dispersed in the binder.

DETAILED DESCRIPTION

As used herein, the term ceramic refers generally to ceramic materials or glass materials. Thus, in the slurry used in one aspect of the method of the present invention, the included ceramic powder can be glass or ceramic particles, or mixtures thereof. Also, the terms fused microstructures, fired microstructures, and ceramic microstructures refer to microstructures formed using the method of the present invention which have been fired at an elevated temperature to fuse or sinter the ceramic particles included therein.

The slurry of the present invention is a mixture containing a ceramic powder, a curable organic binder, and a diluent. When the binder is in its initial uncured state, the mixture is simply referred to as a slurry. After curing the binder, the slurry is in a more rigid state which can retain the shape in which it was formed. This cured, rigid or semi-rigid state is referred to as the green state, just as shaped ceramic materials are called "green" before they are sintered. The green state material can subsequently be debinded and/or fired. Debinding occurs when the green state material is heated to a temperature at which the binder can diffuse to a surface of the material and volatilize. Debinding is usually followed was formed. This cured, rigid or semi-rigid state is referred to as the green state, just as shaped ceramic materials are called "green" before they are sintered. The green state material can subsequently be debinded and/or fired. Debinding occurs when the green state material is heated to a temperature at which the binder can diffuse to a surface of the material and volatilize. Debinding is usually followed by increasing the temperature to a predetermined firing temperature to sinter or fuse the particles of the ceramic powder. After firing, the material is simply referred to as fired material. Fired microstructures are also referred to herein as ceramic microstructures.

The present invention provides a slurry for molding ceramic microstructures on a substrate. The slurry includes at least three components. The first component is a ceramic powder. The ceramic powder will ultimately be fused or sintered by firing to form microstructures and adhered to the substrate having desired physical properties. The second component is a fugitive binder which is capable of being shaped and subsequently hardened by curing, heating or cooling. The binder allows the slurry to be shaped into rigid or semi-rigid green state microstructures which are adhered to the substrate so that the mold used to form the microstructures can be removed in preparation for debinding and firing. The third component is a diluent which can promote release from the mold after hardening of the binder material or promote fast and substantially complete burn out of the binder during debinding before firing the ceramic material of the microstructures. The diluent preferably remains a liquid after the binder is hardened so that the diluent phase-separates from the binder material during hardening.

The ceramic powder is chosen based on the end application of the microstructures and the properties of the substrate to which the microstructures will be adhered. One consideration is the coefficient of thermal expansion (CTE) of the substrate material. Preferably, the CTE of the ceramic material of the slurry of the present invention differs from the CTE of the substrate material by no more than 10%. When the substrate material has a CTE which is much less than or much greater than the CTE of the ceramic material of the microstructures, the microstructures can warp, crack, fracture, shift position, or completely break off from the substrate during processing. Further, the substrate can warp due to a high difference in CTE between the substrate and the ceramic microstructures. Ceramic materials suitable for use in the slurry of the present invention preferably have coefficients of thermal expansion of about $5 \times 10^{-6}/°$ C. to $13 \times 10^{-6}/°$ C.

The substrate preferably can withstand the temperatures necessary to process the ceramic material of the slurry. Glass or ceramic materials suitable for use in the slurry of the present invention preferably have softening temperatures below about 600° C., and usually between about 400° C. and 600° C. The softening temperature of the ceramic powder indicates a temperature that must be attained to fuse or sinter the material of the powder. A preferred choice for the substrate is a glass, ceramic, metal, or other rigid material which has a softening temperature which is higher than that of the ceramic material of the slurry. Preferably, the substrate has a softening temperature higher than the temperature at which the microstructures are to be fired. The substrate preferably should have a CTE approximately in the range discussed above.

Choosing a ceramic powder having a low softening temperature allows the use of a substrate also having a relatively low softening temperature. In the case of glass substrates, soda lime float glass having low softening temperatures is typically less expensive than glass having higher softening temperatures. Thus, the use of a low softening temperature ceramic powder can allow the use of a less expensive glass substrate. In addition, low softening temperature ceramic materials in the slurry of the present invention can make high precision microstructures easier to obtain. For example, when fabricating barrier ribs on a PDP glass substrate, the precision and accuracy in the alignment and placement of the barrier ribs with respect to the electrodes on the substrate should be maintained throughout processing. The ability to fire green state barrier ribs at lower temperatures minimizes the thermal expansion and the amount of stress relief required during heating, thus avoiding undue substrate distortion, barrier rib warping, and barrier rib delamination.

Lower softening temperature ceramic materials can be obtained by incorporating certain amounts of alkali metals, lead, or bismuth into the material. However, for PDP barrier ribs, the presence of alkali metals in the microstructured barriers can cause material from the electrodes to migrate across the substrate during elevated temperature processing. The diffusion of electrode material can cause interference, or "crosstalk", as well as shorts between adjacent electrodes, degrading device performance. Thus, for PDP applications, the ceramic powder of the slurry is preferably substantially free of alkali metal. In addition, the incorporation of lead or bismuth in the ceramic material of the slurry can make environmentally-friendly disposal of the material problematic. When the incorporation of lead or bismuth is not desirable, low softening temperature ceramic material can be obtained using phosphate or $B_2O_3$-containing compositions. One such composition includes BaO and $B_2O_3$. Another such composition includes BaO and $B_2O_3$. Another such composition includes ZnO, BaO, and $B_2O_3$. Another such composition includes $La_2O_3$ and $B_2O_3$. Another such composition includes $Al_2O_3$, ZnO, and $P_2O_5$.

Other fully soluble, insoluble, or partially soluble components can be incorporated into the ceramic material of the slurry to attain or modify various properties. For example, $Al_2O_3$ or $La_2O_3$ can be added to increase chemical durability of the composition and decrease corrosion. MgO can be added to increase the glass transition temperature or to increase the CTE of the composition. $TiO_2$ can be added to give the ceramic material a higher degree of optical opacity, whiteness, and reflectivity. Other components or metal oxides can be added to modify and tailor other properties of the ceramic material such as the CTE, softening temperature, optical properties, physical properties such as brittleness, and so on.

Other means of preparing a composition which can be fired at relatively low temperatures include coating core particles in the composition with a layer of low temperature fusing material. Examples of suitable core particles include $ZrO_2$, $Al_2O_3$, $ZrO_2$—$SiO_2$, and $TiO_2$. Examples of suitable low fusing temperature coating materials include $B_2O_3$, $P_2O_5$, and glasses based on one or more of $B_2O_3$, $P_2O_5$, and $SiO_2$. These coatings can be applied by various methods. A preferred method is a sol-gel process in which the core particles are dispersed in a wet chemical precursor of the coating material. The mixture is then dried and comminuted (if necessary) to separate the coated particles. These particles can be dispersed in the glass or ceramic powder of the slurry or can be used by themselves for the glass powder of the slurry.

The ceramic powder in the slurry which can be used in the method of the present invention is preferably provided in the form of particles which are dispersed throughout the slurry. The preferred size of the particles depends on the size of the microstructures to be formed and aligned on the patterned substrate. Preferably, the average size, or diameter, of the particles in the ceramic powder of the slurry is no larger than about 10% to 15% the size of the smallest characteristic dimension of interest of the microstructures to be formed and aligned. For example, PDP barrier ribs can have widths of about 20 µm, and their widths are the smallest feature dimension of interest. For PDP barrier ribs of this size, the average particle size in the ceramic powder is preferably no larger than about 2 or 3 µm. By using particles of this size or smaller, it is more likely that the microstructures will be replicated with the desired fidelity and that the surfaces of the ceramic microstructures will be relatively smooth. As the average particle size approaches the size of the microstructures, the slurry containing the particles may no longer conform to the microstructured profile. In addition, the maximum surface roughness can vary based in part on the ceramic particle size. Thus, it is easier to form smoother structures using smaller particles.

The fugitive binder of the slurry is an organic binder chosen based on factors such as its ability to bind to the ceramic powder of the slurry, ability of being cured or otherwise hardened to retain a molded microstructure, ability of adhering to the patterned substrate, and ability to volatilize (or burn out) at temperatures at least somewhat lower than those used for firing the green state microstructures. The binder helps bind together the particles of the ceramic powder when the binder is cured or hardened so that the stretchable mold can be removed to leave rigid green state microstructures adhered to and aligned with the patterned substrate. The binder is referred to as a "fugitive binder" because the binder material can be burned out of the microstructures at elevated temperatures prior to fusing or sintering the ceramic particles in the microstructures. Preferably, firing completely burns out the fugitive binder so that the microstructures left on the patterned surface of the substrate are fused glass or ceramic microstructures which are substantially free of carbon residue. In applications where the microstructures used are dielectric barriers, such as in PDPs, the binder is preferably a material capable of debinding at a temperature at least somewhat below the temperature desired for firing without leaving behind a significant amount of carbon which can degrade the dielectric properties of the microstructured barriers. For example, binder materials containing a significant proportion of aromatic hydrocarbons, such as phenolic resin materials, can leave graphitic carbon particles during debinding which can require significantly higher temperatures to completely remove.

The binder is preferably an organic material which is radiation or heat curable. Preferred classes of materials include acrylates and epoxies. Alternatively, the binder can be a thermoplastic material which is heated to a liquid state to conform to the mold and then cooled to a hardened state to form microstructures adhered to the substrate. When precise placement and alignment of the microstructures on the substrate is desired, it is preferable that the binder is radiation curable so that the binder can be hardened under isothermal conditions. Under isothermal conditions (no change in temperature), the stretchable mold, and therefore the slurry in the mold, can be held in a fixed position relative to the pattern of the substrate during hardening of the binder material. This reduces the risk of shifting or expansion of the mold or the substrate, especially due to differential thermal expansion characteristics of the mold and the substrate, so that precise placement and alignment of the mold can be maintained as the slurry is hardened.

When using a fugitive binder which is radiation curable, it is preferable to use a cure initiator that is activated by radiation to which the substrate is substantially transparent so that the slurry can be cured by exposure through the substrate. For example, when the substrate is glass, the fugitive binder is preferably visible light curable. By curing the binder through the substrate, the slurry material adheres to the substrate first, and any shrinkage of the binder material during curing will tend to occur away from the mold and toward the surface of the substrate. This helps the microstructures demold and helps maintain the location and accuracy of the microstructure placement on the pattern of the substrate.

In addition, the selection of a cure initiator can depend on what materials are used for the ceramic powder in the slurry used in the present invention. For example, in applications where it is desirable to form ceramic microstructures which are opaque and highly diffusely reflective, it can be advantageous to include a certain amount of titania ($TiO_2$) in the ceramic powder of the slurry. While titania can be useful for increasing the reflectivity of the microstructures, it can also make curing with visible light difficult because visible light reflection by the titania in the slurry can prevent sufficient absorption of the light by the cure initiator to effectively cure the binder. However, by selecting a cure initiator which is activated by radiation which can simultaneously propagate through the substrate and the titania particles, effective curing of the binder can take place. One example of such a cure initiator is bis(2,4,6-trimethylbenzoyl)-phenylphosphineoxide, a photoinitiator commercially available from Ciba Specialty Chemicals, Hawthrone, N.Y., under the trade designation Irgacure 819. Another example is a ternary photoinitiator system prepared such as those described in U.S. Pat. No. 5,545,670 such as a mixture of ethyl dimethylaminobenzoate, camphoroquinone, and diphenyl iodonium hexafluorophosphate. Both of these examples are active in the blue region of the visible spectrum near the edge of the ultraviolet in a relatively narrow region where the radiation can penetrate both a glass substrate and titania particles in the slurry. Other cure systems may be selected for use in the process of the present invention based on the binder, the materials of the ceramic powder in the slurry, and the material of the mold or the substrate through which curing is to take place.

The diluent of the slurry used in the method of the present invention is a material selected based on factors such as its ability to enhance mold release properties of the slurry subsequent to curing the fugitive binder and to enhance debinding properties of green state structures made using the slurry. The diluent is preferably a material that is soluble in the binder prior to curing and which remains liquid after curing the fugitive binder. This provides two advantages. First, by remaining a liquid when the binder is hardened the diluent reduces the risk of the cured binder material adhering to the mold. Second, by remaining a liquid when the binder is hardened, the diluent phase separates from the binder material, thereby forming an interpenetrating network of small pockets, or droplets, of diluent dispersed throughout the cured binder matrix. The advantages of phase separation of the diluent will become clear in the discussion that follows.

For many applications, such as PDP barrier ribs, it is desirable for debinding of the green state microstructures to be substantially complete before firing. Additionally, debinding is often the longest and highest temperature step in thermal processing. Thus, it is desirable for the slurry to be capable of debinding relatively quickly and completely and at a relatively low temperature. The preference for low temperatures is discussed in detail below.

While not wishing to be bound by any theory, debinding can be thought of as being kinetically and thermodynamically limited by two temperature-dependent processes, namely diffusion and volatilization. Volatilization is the process by which decomposed binder molecules evaporate from a surface of the green state structures and thus leave a porous network for resin egress to proceed in a less obstructed manner. In a single phase resin binder, internally-trapped gaseous degradation products can blister and/or rupture the structure. This is more prevalent in binder systems that leave a high level of carbonaceous degradation products at the surface which can form an impervious skin layer to stop the egress of binder degradation gases. In cases where single phase binders are successful, the cross sectional area is relatively small and the binder degradation heating rate is inherently long to prevent a skin layer from forming.

The rate at which volatilization occurs depends on temperature, an activation energy for volatilization, and a frequency, or sampling rate. Because volatilization occurs primarily at or near surfaces, the sampling rate is proportional to the total surface area of the structures. Diffusion is the process by which binder molecules migrate to surfaces from the bulk of the structures. Due to volatilization of binder material from the surfaces, there is a concentration gradient which tends to drive binder material toward the surfaces where there is a lower concentration. The rate of diffusion depends on temperature, an activation energy for diffusion, and a frequency.

Because volatilization is limited by the surface area, if the surface area is small relative to the bulk of the microstructures, heating too quickly can cause volatile species to be trapped. When the internal pressure gets large enough, the structures can bloat, break or fracture. To curtail this effect, debinding can be accomplished by a relatively gradual increase in temperature until debinding is complete. A lack of open channels for debinding, or debinding too quickly, can also lead to a higher tendency for residual carbon formation. This in turn requires higher debinding temperatures to ensure complete debinding. When debinding is complete, the temperature can be ramped up more quickly to the firing temperature and held at that temperature until firing is complete. At this point, the articles can then be cooled.

The diluent enhances debinding by providing shorter pathways for diffusion and increased surface area. The diluent preferably remains a liquid and phase separates from the fugitive binder when the binder is cured or otherwise hardened. This creates an interpenetrating network of pockets of diluent dispersed in a matrix of hardened binder material. The faster that curing or hardening of the binder material occurs, the smaller the pockets of diluent will be. Preferably, after hardening the binder, a relatively large amount of relatively small pockets of diluent will be dispersed in a network throughout the green state structures. During debinding, the low molecular weight diluent can evaporate quickly at relatively low temperatures prior to decomposition of the other high molecular weight organic components. Evaporation of the diluent leaves behind a somewhat porous structure, thereby greatly increasing the surface area from which remaining binder material can volatilize and greatly decreasing the mean path length over which binder material must diffuse to reach these surfaces. Therefore, by including the diluent, the rate of volatilization during binder decomposition is increased by increasing the available surface area, thereby increasing the rate of volatilization for the same temperatures. This makes pressure build up due to limited diffusion rates less likely to occur. Furthermore, the relatively porous structure allows pressures that are built up to be released easier and at lower thresholds.

The result is that debinding can be performed at a faster rate of temperature increase while lessening the risk of microstructure breakage. In addition, because of the increased surface area and decreased diffusion length, debinding is complete at a lower temperature.

The diluent is not simply a solvent compound for the resin. The diluent is preferably soluble enough to be incorporated into the resin mixture in the uncured state. Upon curing of the binder of the slurry, the diluent should phase separate from the monomers and/or oligomers participating in the cross-linking process. Preferably, the diluent phase separates to form discrete pockets of liquid material in a continuous matrix of cured resin, with the cured resin binding the particles of the glass frit or ceramic powder of the slurry. In this way, the physical integrity of the cured green state microstructures is not greatly compromised even when appreciably high levels of diluent are used (i.e., greater than about a 1:3 diluent to resin ratio).

Preferably the diluent has a lower affinity for bonding with the ceramic powder material of the slurry than the affinity for bonding of the binder material with the ceramic powder. When hardened, the binder should bond with the particles of the ceramic powder. This increases the structural integrity of the green state structures, especially after evaporation of the diluent. Other desired properties for the diluent will depend on the choice of ceramic powder, the choice of binder material, the choice of cure initiator (if any), the choice of the substrate, and other additives (if any). Preferred classes of diluents include glycols and polyhydroxyls, examples of which include butanediols, ethylene glycols, and other polyols.

The diluent is not simply a solvent compound for the resin. The diluent is preferably soluble enough to be incorporated into the resin mixture in the uncured state. Upon curing of the binder of the slurry, the diluent should phase separate from the monomers and/or oligomers participating in the cross-linking process. Preferably, the diluent phase separates to form discrete pockets of liquid material in a continuous matrix of cured resin, with the cured resin binding the particles of the glass frit or ceramic powder of the slurry. In this way, the physical integrity of the cured green state microstructures is not greatly compromised even when appreciably high levels of diluent are used (i.e., greater than about a 1:3 diluent to resin ratio). The following examples serve to illustrate the benefits of a diluent component in the slurry of the present invention.

To perform the functions of promoting mold release properties after hardening of the binder and of promoting facile volatilization during debinding, the diluent of the slurry of the present invention should be selected based on certain properties. Preferably, the diluent is a material which is liquid at room temperature and is soluble in the uncured binder. The diluent should phase separate with the binder material upon hardening of the binder. The diluent preferably has a lower evaporation temperature than the fugitive binder material to enhance debinding as discussed above. Preferably the diluent has a lower affinity for bonding with the ceramic powder material of the slurry than the affinity for bonding of the binder material with the ceramic powder. When hardened, the binder should bond with the particles of the ceramic powder. This increases the structural integrity of the green state structures, especially after evaporation of the diluent. Other desired properties for the diluent will be recognized by the ordinarily skilled artisan depending on the choice of ceramic powder, the choice of binder material, the choice of cure initiator (if any), the choice of the substrate, and other additives (if any). Preferred classes of diluents include glycols and polyhydroxyls, examples of which include butanediols and ethylene glycols, as well as other polyols.

In addition to ceramic powder, fugitive binder, and diluent, the slurry can optionally include other materials. For example, the slurry can include an adhesion promoter to promote adhesion to the substrate. For glass substrates, or other substrates having silicon oxide or metal oxide surfaces, a silane coupling agent is a preferred choice as an adhesion promoter. A preferred silane coupling agent is a silane coupling agent having three alkoxy groups. Such a silane can optionally be pre-hydrolyzed for promoting better adhesion to glass substrates. A particularly preferred silane coupling agent is a silano primer such as sold by Manufacturing Co. (3M), St. Paul, Minn. under the trade designation Scotchbond Ceramic Primer. Other optional additives can include materials such as dispersants which aid in mixing the ceramic powder with the other components of the slurry of the present invention. Optional additives can also include surfactants, catalysts, anti-aging components, release enhancers, and so on.

The slurry of the present invention can be used to form ceramic microstructures on a substrate using a mold. The mold for forming the microstructures has a surface with a plurality of microstructured features thereon. The slurry of the present invention is then placed between the microstructured surface of the mold and a surface of the substrate so that the slurry substantially fills the profile of the microstructured surface of the mold. The binder of the slurry is then hardened by radiation curing, thermal curing, or cooling from a melted state to produce green state material adhered to the substrate. When the mold is removed, the green state structures adhered to the substrate are microstructures which substantially replicate the microstructured features of the mold. A preferred mold and process for molding is disclosed in co-pending and cofiled U.S. application Ser. No. 09/219,803, the disclosure of which is incorporated by reference herein. The present invention will now be illustrated by the following non-limiting examples.

EXAMPLES

Examples 1–5

Various concentrations of diluent in a slurry were investigated for benefits of mold release and debinding rate. The molds used were polycarbonate or photo-curable acrylate material which was cast and cured onto a high stiffness backing material such as polyethylene terephthalate (PET). The cast and cured polycarbonate or acrylate material formed the patterned surface of the mold. Cure shrinkage of the slurry and chemical interaction between the slurry and the polymer mold can cause difficulty with demolding. Bonding between the slurry and mold can result in longer processing times, fracturing of the cured microstructures, or mold failure. Enhancing the demolding characteristics is desirable to improve molding yield and to prolong the life of the mold as well as to yield higher fidelity replicated structures of the cured slurry. For PDP barrier rib manufacturing, the ability of fast firing is desirable to reduce cycle time and cost. The binder must debind, or burn out, quickly and completely to achieve fast firing. Proper design and incorporation of a diluent component into the slurry of the present invention can enhance both demolding and debinding.

A photocurable resin active in the visible light region was used as the binder in preparing the slurry samples in Examples 1–5. Glass frit was used as the glass powder of the slurry. The glass frit was a lead borosilicate glass powder as commercially available from Asahi Glass Co., Japan, under the trade designation RFW030, and had an average particle size of 1.2 $\mu$m. The base resin was composed of 50% by weight bisphenol-a diglycidyl ether dimethacrylate (BISGMA) and 50% by weight triethylene glycol dimethacrylate (TEGDMA). An initiator system which allows curing using visible light in the blue region of the spectrum was used and was composed of ethyl dimethylaminobenzoate, camphoroquinone, and diphenyl iodonium hexafluorophosphate. The initiator level was kept at 2% by weight of the organic components for all the samples. Glass frit loading in all the slurries were about 45% to 47% by volume. A phospate ester dispersant was used to help incorporation of the glass frit into the organic components. Curing was performed using a blue light source (380–470 nm) irradiated through the glass substrate used. Dosage was 1 to 1.5 J/cm$^2$. The diluent selected for Examples 1–5 was 1,3 butanediol. 1,3 butanediol is not soluble in the BISGMA alone, but is soluble in the BISGMA/TEGDMA mixture. The diluent content in percentage by weight of the organic components was as shown in Table 1.

TABLE 1

| Example | Diluent (% by weight) |
|---------|----------------------|
| 1 | 10 |
| 2 | 20 |
| 3 | 30 |
| 4 | 35 |
| 5 | 40 |

Debinding Properties

To study effects on binder burn out, thick films of the slurry according to Examples 1–5 were prepared on glass substrates for firing. The glass substrates were 2.5 mm thick soda-lime-glass as commercially available from Libbey-Owens-Ford Co., Toledo, Ohio. A knife coater was used to cast a uniform slurry layer onto the glass substrates. The knife coater gap was set at 200 $\mu$m. The coatings were cured with a blue light for 1 minute. The samples were then fired in a box furnace having an air flow of 30 scfh (standard cubic feet per hour). The firing schedule was 5° C./minute to 540° C. for a 20 min soak. The samples were then cooled at 2–3° C./min. After firing, the fused layers were about 70 to 80 $\mu$m thick. The 10% sample, the formulation of Example 1, was severely cracked to a point at which the fragments did not adhere to the glass substrate after firing. The formulation of Example 2, the 20% diluent sample, also cracked, but remained adhered to the substrate. The formulations of Examples 3, 4, and 5 remained intact without cracking and were adhered to the substrate. These results indicate that higher diluent concentrations in a slurry allow more facile binder burn out, presumably due to evaporation of the diluent leaving more pathways for debinding so that stresses which might otherwise cause fracturing can be relieved.

Mold Release Properties

Mold release after curing was studied quantitatively with a peel tester commercially available from Instramentors, Inc., Strongville, Ohio, under the trade designation Model SP-102C-3M90. Sheets of a polymer mold having rectangular channels were used for forming rib structures from the glass slurries of Examples 1–5 onto soda-lime glass substrates. The channels in the mold were nominally 75 $\mu$m wide, 185 $\mu$m deep, and 220 $\mu$m in pitch spacing. Sample fabrication involved laminating the glass slurry samples between the glass substrate and the mold, followed by curing the samples. The slurry essentially filled the channels of the mold during lamination to thereby replicate the mold features onto the glass substrate after curing. The molds were about 2.5 cm wide by about 22 cm long. The channels were parallel to the long dimension of the molds. After lamination, the samples were cured using a blue light source for a dosage of 1 to 1.5 J/cm$^2$. After curing, the molds were released by peeling along the direction of the channels and the peel force was measured. Peel test was performed at 90° to the substrate and at a speed of about 20 cm per minute. The average peel force measurements are shown in Table 2.

TABLE 2

| Example | Diluent (% by weight) | Peel Force (kg/cm) |
|---|---|---|
| 1 | 10 | (mold failure) |
| 2 | 20 | 0.71 |
| 3 | 30 | 0.47 |
| 4 | 35 | 0.16 |
| 5 | 40 | 0.10 |

The formulation of Example 1 did not give conclusive results because the adhesion to the mold was so strong that the mold tore in the peel process. The benefit of the diluent in enhancing mold release is evident from Table 2. However, note that at very high diluent levels, the physical integrity of the cured green state structures can be degraded significantly due to the relatively high liquid content. The formulation of Example 5 showed some defects after curing due to the breakage of the green state structures. The formulations of Examples 2, 3, and 4, representing diluent contents above 10% and below 40%, showed good green state physical integrity as well as adequate mold release properties.

Example 6

A spatula was used to mix an epoxy binder with 82.3% by weight (43.3% by volume) of yttria-stabilized zirconia powder (commercially available from Zirconia Sales America, grade HSY-3B). The average particle size in the zirconia powder size was 0.4 microns. The epoxy binder was mixed with a diluent and a surfactant in amounts of of 54.2% by weight epoxy, 36.4% by weight diluent and 9.4% by weight surfactant. The epoxy was a blend of bisphenol A epoxide (as commercially available from Celanese Corp., Louisville, Ky., under the trade designation Celanese DER 332), and an amine curing agent (as commercially available from Celanese Corp. under the trade designation Epi-cure 826). The curing agent level was 26% by weight of the epoxy. The diluent system was a blend of 65% by weight of 1,3 butanediol and 35% by weight of polyethylene glycol (as commercially available from Sigma Chemical, St. Louis, Mo., under the trade designation Carbowax 200). The polyethylene glycol served to solubilize the butanediol in the epoxy. The surfactant was a material commercially available from ICI Americas Inc., New Castle, Del., under the trade designation hypermer KD 1. The surfactant served to help incorporate the zirconia powder in the resin. The slurry was molded onto a plastic substrate and then transferred to an alumina substrate for debinding by heating to 600° C. at a rate of 5° C. per minute. The material was then fired by ramping the temperature to 1400° C. at a rate of 10° C. per minute and held there for 1 hour.

The slurry of Example 6 can be made by mixing the following materials in the following amounts:

51.0 g yttria-stabilized zirconia powder 4.40 g bisphenol A epoxide 1.56 g curing agent 2.60 g polyethylene glycol 1.40 g 1,3 butanediol 1.02 g surfactant.

Example 7

An acrylate binder was mixed with 85.5% by weight of yttria stabilized zirconia powder. The zirconia powder was a bimodal blend of grade HSY-3B (as used in Example 6) with 12.3% by weight of grade HSY-3U as commercially available from the same company. Grades HSY-3B and HSY-3U have respective average particle sizes of 0.4 and 0.1 microns. The binder was 50.5% of an acrylate resin (described below), 44.4% by weight diluent and 5.0% by weight surfactant. Specifically, the resin was a blend of 50% by weight bisphenol A diglycidyl ether dimethacrylate (BISGMA) and 50% by weight triethylene glycol dimethacrylate (TEGMA). The cure initiator was a mixutre of ethyl dimethylaminobenzoate, camphoroquinone and diphenyl iodonium hexafluorophosphate. The initiator level was 2% by weight of the acrylate base resin. The diluent was 50% by weight diallyl phthalate and 50% by weight butyl strearate. The diallyl phthalate plasticizer in the diluent served to reduce resin viscosity for improving moldability and to solubilize the butyl stearate in the acrylate resin. The butyl strearate in the diluent allowed for phase separation of the diluent upon curing of the binder to aid mold release and allow speedy egress of the binder material during debinding. The surfactant (available from ICI Americas, Inc., under the trade designation hypermer KD1) was used to incorporate the zirconia powder into the binder. The slurry was molded onto a glass substrate and cured by exposure to blue light through the substrate and through the mold 2.5 minutes before being demolded from the polymer mold that was used. The debinding and firing schedule was the same as used in Example 6.

The slurry of Example 7 can be made by mixing the following materials in the following amounts:

510.10 g yttria stabilized zirconia powder grade HSY-3B 71.50 g yttria stabilized zirconia powder grade HSY-3U 50.00 g 50/50 BISGMA/TEGMA blend 22.20 g diallyl phthalate 22.20 g butyl stearate 5.00 g surfactant.

What is claimed is:

1. A curable paste for patterning microstructures on a substrate using a mold, the paste comprising a mixture of:

a ceramic powder;

a crosslinkable binder comprising an acrylic resin; and a diluent comprising butane diol, the diluent to resin ration being about 1:3 or greater.

2. The curable paste of claim 1, further comprising a silane coupling agent.

3. The curable paste of claim 1, further comprising TiO$_2$ particles mixed therein.

4. The curable pate of claim 1, wherein the binder includes a cure initiator capable of being activated by exposure to blue light.

5. The curable paste of claim 1, wherein the ceramic powder is substantially free of alkali metals.

6. The curable paste of claim 1, wherein the ceramic powder is substantially free of lead.

7. The curable paste of claim 1, wherein the binder is crosslinkable by exposure to visible light.

* * * * *

UNITED STATES PATENT AND TRADEMARK OFFICE
CERTIFICATE OF CORRECTION

PATENT NO. : 6,713,526 B2
DATED : March 30, 2004
INVENTOR(S) : Dillon, Kenneth R.

It is certified that error appears in the above-identified patent and that said Letters Patent is hereby corrected as shown below:

<u>Title page,</u>
Item [56], References Cited, FOREIGN PATENT DOCUMENTS, delete "WO 92961" and insert -- 22961 --, therefore.

<u>Column 2,</u>
Line 62, delete "was formed. This cured, rigid or semi-rigid state is referred to as the green state, just as shaped ceramic materials are called "green" before they are sintered. The green state material can subsequently be debinded and/or fired. Debinding occurs when the green state material is heated to a temperature at which the binder can diffuse to a surface of the material and volatilize. Debinding is usually followed."

<u>Column 4,</u>
Line 26, delete "BaO" and insert -- ZnO --, therefore.

<u>Column 6,</u>
Line 48, delete "hardened the" and insert -- hardened, the --, therefore.

<u>Column 9,</u>
Line 37, after "09/219,803" insert -- (attorney docket no. 54046USA4A) --.
Line 38, begin new paragraph with "The present invention …".

<u>Column 10,</u>
Line 15, delete "phospate" and insert -- phosphate --, therefore.

<u>Column 11,</u>
Line 31, after "to" delete "the".
Line 43, delete "of" before "54.2%".

UNITED STATES PATENT AND TRADEMARK OFFICE
CERTIFICATE OF CORRECTION

PATENT NO. : 6,713,526 B2
DATED : March 30, 2004
INVENTOR(S) : Dillon, Kenneth R.

It is certified that error appears in the above-identified patent and that said Letters Patent is hereby corrected as shown below:

Column 12,
Line 57, delete "pate" and insert -- paste --, therefore.

Signed and Sealed this

Twenty-sixth Day of October, 2004

JON W. DUDAS
*Director of the United States Patent and Trademark Office*